US010970432B2

(12) United States Patent
Zhu et al.

(10) Patent No.: US 10,970,432 B2
(45) Date of Patent: Apr. 6, 2021

(54) DISCRETE STATE EVENT-DRIVEN SIMULATION METHOD FOR SIMULATION OF POWER ELECTRONIC SYSTEM

(71) Applicant: TSINGHUA UNIVERSITY, Beijing (CN)

(72) Inventors: Yicheng Zhu, Beijing (CN); Zhengming Zhao, Beijing (CN); Bochen Shi, Beijing (CN); Zhujun Yu, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 342 days.

(21) Appl. No.: 16/237,512

(22) Filed: Dec. 31, 2018

(65) Prior Publication Data

US 2020/0125686 A1    Apr. 23, 2020

(30) Foreign Application Priority Data

Oct. 23, 2018    (CN) .......................... 201811236030.7

(51) Int. Cl.
  *G06F 7/62*      (2006.01)
  *G06F 30/20*     (2020.01)
  *G06F 9/54*      (2006.01)

(52) U.S. Cl.
  CPC .............. *G06F 30/20* (2020.01); *G06F 9/542* (2013.01)

(58) Field of Classification Search
  CPC ...................................................... G06F 30/20
  (Continued)

(56) References Cited

U.S. PATENT DOCUMENTS 7,369,977 B1 *   5/2008  Clune ................ G06Q 10/0633
                                                     703/6
10,747,918 B2 *  8/2020  Li .......................... G06F 30/20
(Continued)

FOREIGN PATENT DOCUMENTS

CN          107025335          8/2017
CN          107290977 A    * 10/2017   ........... G06F 30/367
(Continued)

OTHER PUBLICATIONS

Boyang Li, A Novel Simulation Method for Power Electronics: Discrete State Event Driven Method. (Year: 2017).*
(Continued)

*Primary Examiner* — Lechi Truong
(74) *Attorney, Agent, or Firm* — Hauptman Ham, LLP (57) ABSTRACT

A discrete state event-driven (DSED) simulation method for simulation of a power electronic system is disclosed. With respect to continuous states and discrete events in the power electronic system, the method includes: numerical integration of the continuous states with a flexible adaptive (FA) algorithm having both variable step-size and variable order; and location of the discrete events with an event-driven (ED) mechanism, in which active events are picked out and pre-scheduled before their occurrence while passive events are located by iterative search. The proposed to DSED simulation method can achieve significant improvement in simulation efficiency, with remarkably reduced computational costs at the same level of numerical accuracy. The proposed DSED simulation method is particularly applicable for complex power electronic systems with modular combined topology and high switching frequency.

16 Claims, 4 Drawing Sheets

(58) Field of Classification Search
USPC .......................................................... 703/17
See application file for complete search history.

(56) References Cited

U.S. PATENT DOCUMENTS

| | | | | |
|---|---|---|---|---|
| 2010/0042380 A1* | 2/2010 | Suh | ................ | G06F 30/00 |
| | | | | 703/1 |
| 2011/0040549 A1* | 2/2011 | Ciarallo | ................ | G06F 30/33 |
| | | | | 703/17 |
| 2017/0207761 A1* | 7/2017 | Raman | ................ | H03F 3/387 |
| 2019/0068146 A1* | 2/2019 | Raman | ................ | H03F 3/45753 |

FOREIGN PATENT DOCUMENTS

| | | | | |
|---|---|---|---|---|
| CN | 109541961 A | * | 3/2019 | ............. G06F 30/20 |
| CN | 109541961 B | | 10/2020 | |

OTHER PUBLICATIONS

Office Action dated Mar. 19, 2020 and English translation from corresponding application No. CN 201811236030.7.
Search Report dated Mar. 13, 2020 and English translation from corresponding application No. CN 201811236030.7.
R. Barrio et al., "VSVO Formulation of the Taylor Method for the Numerical Solution of ODEs", Computers and Mathematics with Applications, 50 (2005), pp. 93-111.
Notification of Granting Patent Right issued in corresponding Chinese Application No. 201811236030.7; dated Sep. 3, 2020; 3 pgs.

* cited by examiner

DISCRETE STATE EVENT-DRIVEN SIMULATION METHOD FOR SIMULATION OF POWER ELECTRONIC SYSTEM

FIELD

Some embodiments of the present invention relate to the field of power electronics simulation, and more specifically, to a discrete state event-driven simulation method for simulation of a power electronic system.

BACKGROUND

Power electronic systems are intrinsically hybrid dynamic systems composed of continuous states and discrete events. Considering the hybrid nature of power electronic systems, an accurate and efficient simulation framework for power electronic systems requires flexible integration of continuous states and efficient location of discrete events.

There are a variety of commercial simulation software for power electronic systems, such as Simulink and PLECS. Although widely used, they demonstrate inefficiency in the following aspects. Firstly, with respect to integration of continuous states, these commercial simulators only provide variable-step but fixed-order numerical integration algorithms, such as the classical Dormand-Prince algorithm (i.e., ode45 algorithm in Simulink and DOPRI algorithm in PLECS). Since these algorithms are not capable of adjusting their order adaptively, they exhibit limited flexibility and thus limited efficiency. Secondly, with respect to location of discrete events, all the discrete events are treated as passive events, neglecting the possibility of pre-scheduling the active events to avoid iterative calculations. Moreover, since the explicit expressions of system states as functions of time cannot be obtained, the entire numerical integration process has to be involved in the iterative calculations to locate passive events, which is quite computationally burdensome.

SUMMARY

As discussed above, simulation of large-scale complex power electronic systems can be computationally burdensome and time-consuming. An object of at least one embodiment of the prevent invention is to provide an efficient discrete state event-driven (DSED) method for simulation of power electronic systems to address these issues.

The embodiments of at least one aspect of the present invention provide a discrete state event-driven (DSED) simulation method for simulation of a power electronic system, wherein:

with respect to continuous states and discrete events in the power electronic system, the method includes:

numerical integration of the continuous states by a flexible adaptive (FA) algorithm with both variable step-size and variable order; and location of the discrete events with an event-driven (ED) mechanism, in which active events are picked out and pre-scheduled before their occurrence while passive events are located by iterative search, In at least one embodiment, the active events are discrete events whose occurrence times can be determined in advance, including:

state events, which are triggered when an estimated error of a step reaches a user-specified error tolerance as the step-size extends, control events, which are triggered by digital controllers in the power electronic system, and external events, whose occurrence times can be pre-specified by a user before the simulation begins; and the passive events are discrete events whose occurrence times cannot be determined in advance In at least one embodiment, in the k-th simulation interval, the power electronic system is modeled as a linear time-invariant (LTI) system characterized by state equations, output equations and threshold equations as shown in Equations (1)-(3), respectively:

$$\dot{x}(t) = A_k x(t) + B_k u(t) \quad t_k \le t \le t_{k+1} \quad (1)$$

$$y(t) = C_k x(t) + D_k u(t) \quad t_k \le t \le t_{k+1} \quad (2)$$

$$y_2(t) = c_{th} \quad (3)$$

where x is a state vector comprising a set of independent state variables, y is a output vector representing a set of outputs, and u is an input vector representing a set of independent inputs; $A_k, B_k, C_k, D_k$ are coefficient matrices determined by system topology and parameters; output vector y is comprised of two parts: a display vector $y_1$, which is a set of output variables of interest for simulation waveform display, and a trigger vector $y_2$, which is a set of output variables obtained for the detection of passive events, when any element of $y_2$ crosses its corresponding threshold condition value in the threshold vector $c_{th}$, a passive event will be detected; the coefficient matrices are functions of switching state vector $sw_k$ and system parameter vector $P_k$, as shown in Equation (4):

$$M_k = M(sw_k, P_k) \quad M = A, B, C, D \quad (4)$$

In at least one embodiment, the DSED simulation method includes:

Step (1): simulation preparation and system state initialization;

Step (2): system state updating and control event/external event handling;

Step (3): coefficient matrices updating and simulation waveform output;

Step (4): flexible adaptive numerical integration of system states;

Step (5): passive event location; and

Step (6): simulation process control.

In at least one embodiment, in Step (1), the simulation preparation includes inputting system parameters, formulating systems equations and setting external events.

In at least one embodiment, in Step (2), if any control event or/and external event occurs, the switching states of controllable power switching devices or/and system parameters are updated, and the time interval of the next control event or/and external event is calculated.

In at least one embodiment, in Step (3), if all switching states of power switching devices and system parameters remain unchanged, the coefficient matrices are the same as those at the previous simulation time point, and the output equation is calculated and simulation waveform is output; if the switching state of any power switching device or any system parameter changes, the coefficient matrices are updated and output equation calculation and simulation waveform output are performed twice.

In at least one embodiment, Step (4) includes:

making an initial estimate of the step-size by finding the most urgent event from all control events and external events, calculating the time derivatives and increments of the state vector based on the recursive property of state equations, performing accuracy evaluation, and making order selection and step-size adjustment, and performing numerical integration.

In at least one embodiment, in Step (5), if a trigger variable crosses its corresponding threshold value, a passive event will be detected and will be located with a secant method, the step-size is shortened, and numerical integration is performed again.

Embodiments of at least one aspect of the present invention provide a computer-readable storage medium having stored thereon program codes which can be executed by one or more processors to perform the DSED simulation method according to at least one embodiment above.

BRIEF DESCRIPTION OF THE DRAWINGS

The above and other features and advantages of the present invention can be better understood from the detailed description of the embodiments in conjunction with the drawings, wherein.

DETAILED DESCRIPTION

Embodiments of the present invention will be described in detail in conjunction with the accompanying drawings. These embodiments are only illustrative and for explaining the present invention, but shall not be considered as a limitation thereto. In the figures, the same or similar reference numbers denote the same or similar elements.

An efficient discrete state event-driven (DSED) simulation method for simulation of power electronic systems is proposed.

Considering the hybrid nature of power electronic systems, two methods are proposed to handle continuous system states and discrete system events. Specifically, a flexible adaptive (FA) algorithm with both variable step-size and variable order is proposed for flexible integration of continuous states. An event-driven (ED) mechanism is proposed for efficient location of discrete events.

With the proposed DSED simulation method, power electronic systems are modeled as hybrid dynamic systems, in which continuous states are modeled with the state variable approach while discrete events are defined as triggers of simulation calculations.

Modeling of Continuous States

In the k-th simulation interval, extending from time point $t=t_k$ to time point $t=t_{k+1}$, a power electronic system can be modeled as a linear time-invariant (LTI) system that can be characterized by a set of n first-order ordinary differential equations (ODEs) as Equation (1), called the state equation, a set of m algebraic equations as Equation (2), called the output equation, and a set of $m_2$ algebraic equations as Equation (3), called the threshold equation $$\dot{x}(t)=A_k x(t)+B_k u(t) \quad t_k<t\leq t_{k+1} \tag{1}$$

$$y(t)=C_k x(t)+D_k u(t) \quad t_k<t\leq t_{k+1} \tag{2}$$

$$y_2(t)=c_{th} \tag{3}$$

where x is a n×1 vector consisting a set of independent state variables, y is a m×1 vector representing the m outputs, and u is a l×1 vector representing the l independent inputs. $A_k,B_k,C_k,D_k$ are coefficient matrices that are determined by system topology and parameters. Output vector y is comprised of two parts: a display vector $y_1$, which is a set of $m_1$ output variables of interest for simulation waveform display, and a trigger vector $y_2$, which is a set of $m_2$ output variables obtained for the detection of passive events. When any element of $y_2$ crosses its corresponding threshold condition value in the threshold vector $c_{th}$, a passive event will be detected. The coefficient matrices can be given as functions of switching state vector $sw_k$ and system parameter vector $P_k$, as shown in Equation (4):

$$M_k=M(sw_k,P_k) \quad M=A,B,C,D \tag{4}$$

Definition of Discrete Events

Under the proposed DSED simulation framework, simulation calculations are triggered spontaneously by discrete events. The discrete events in power electronic systems can be classified into the following four categories.

(i) State Event: Under the proposed DSED simulation framework, numerical integration of continuous system states is performed based on the discrete event perspective. The discrete events that are triggered when the estimated error of a step reaches the user-specified error tolerance as the step-size extends are defined as state events.

(ii) Control Event: The discrete events that are triggered by digital controllers in power electronic systems are defined as control events, typically including: (a) switching events of controllable power semiconductor switches (e.g. MOSFETs, IGBTs, etc.) under the control of digital controllers, and (b) sampling events of digital controllers, etc.

(iii) External Event: The discrete events whose occurrence times can be pre-specified by the user before the simulation begins are defined as external events, so called since they usually involve the changes of external conditions in power electronic systems, such as sudden changes of loads and sources.

The above three types of events are all active events, so called since their occurrence times can be pre-calculated before they occur and they will trigger simulation calculations spontaneously when time reaches the predetermined event instants.

(iv) Passive Event: Unlike active events, the time when passive events occur cannot be determined in advance. Passive events can be detected when system states cross the corresponding pre-defined threshold values, as described mathematically in Equation (3), and then located with iterative search. Switching events of uncontrollable power semiconductor switches (e.g. diodes) and occurrences of system faults fall into this category.

Figure 1:
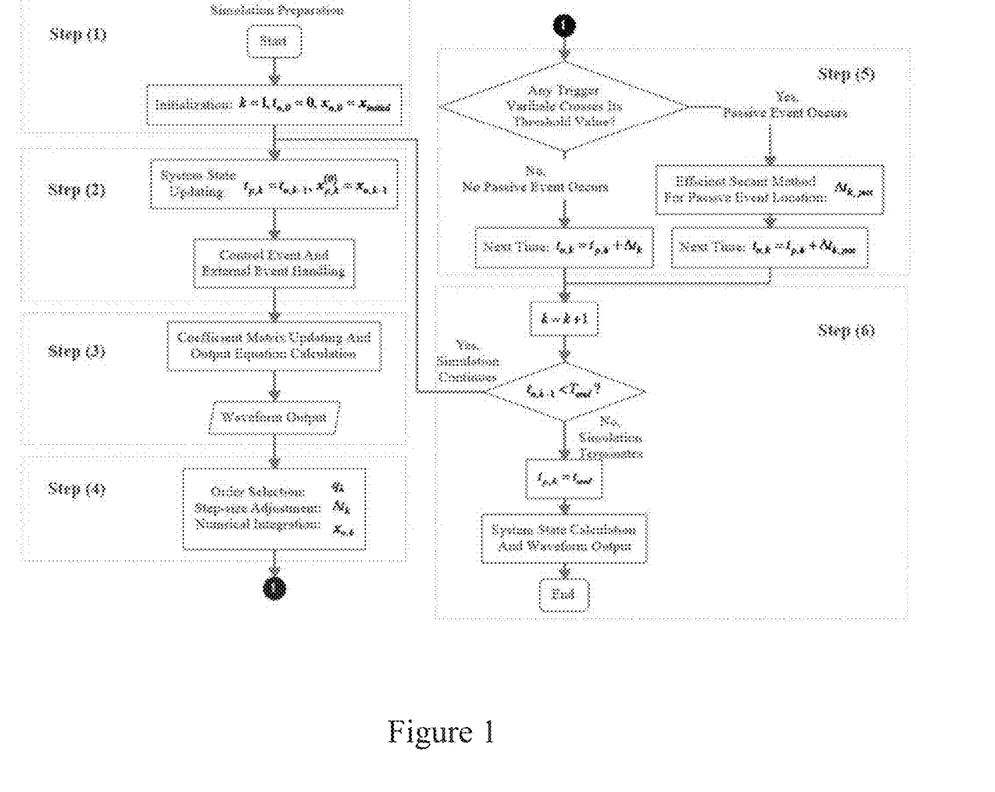
FIG. 1 shows the flowchart of the discrete state event-driven (DSED) simulation method for simulation of power electronic systems according to at least one embodiment of the present invention.

The discrete state event-driven (DSED) simulation method for simulation of power electronic systems according to an embodiment of the present invention includes the following steps as shown in FIG. 1.

Step (1): simulation preparation and system state initialization;

Step (2): system state updating and control event/external event handling;

Step (3): coefficient matrices updating and simulation waveform output;

Step (4): flexible adaptive numerical integration of system states;

Step (5): passive event location; and

Step (6): simulation process control.

Step (1): Simulation Preparation and System State Initialization

This step includes inputting system parameters, formulating systems equations, setting external events and initializing system states, etc., as described in the following sub-steps.

Step (1.1) Inputting system parameters. The parameters of the main circuit and the controller of the simulated system are input.

Step (1.2) Formulating system equations. The state equation, output equation and threshold equation of the simulated system are formulated according to the circuit topology, system parameters and switching states of power switching devices, as show in Equations (1)-(4).

Step (1.3) Setting external events. The time line of external events and their specific contents are preset.

Step (1.4) Initializing system states. The state variables, switching states of power switching devices and memory of controllers are initialized. After finishing this step, the simulation process enters the main loop (Steps (2)-(5)) of the proposed DSED simulation method.

Step (2): System State Updating and Control Event/External Event Handling

This step includes updating system states and handling control events/external events, as described in the following sub-steps.

Step (2.1) Updating system states. The updating is as shown in Equation (5):

$$t_{p,k}=t_{n,k-1}, x_{p,k}^{(0)}=x_{n,k-1} \tag{5}$$

Herein the subscript p means "present" and the subscript n means "next", respectively.

Step (2.2) Handling control events and external events. If a control event occurs, sampling or switching operations are performed according to the instructions given by controllers, the switching states of controllable power switching devices $sw_{act,k}$ are updated, and the time interval of the next control event $\Delta t_{ctr}$ is calculated. If an external event occurs, the system parameter vector $P_k$ is updated according to its content and the time interval of the next control event $\Delta t_{ext}$ is calculated.

Step (3): Coefficient Matrices Updating and Simulation Waveform Output

This step includes updating coefficient matrices and outputting simulation waveforms, as described below.

It is determined whether or not the switching state vector $sw_k$ and system parameter vector $P_k$ have changed. If both $sw_k$ and $P_k$ remain unchanged, the coefficient matrices in the k-th interval will be the same as that in the (k−1)-th interval, and then the output equation is calculated and simulation waveform is output. If $sw_k$ or $P_k$ changes, then firstly, the output equation is calculated with the coefficient matrices at the (k−1)-th interval $C_{1,k-1}$ and $D_{1,k-1}$ and the first simulation waveform output is performed. Then the coefficient matrices are updated according to the latest switching states of power switching devices and system parameter vector, as shown in Equation (4). The output equation is calculated again and the second simulation waveform output is performed.

Step (4): Flexible Adaptive Numerical Integration of System States

The proposed flexible adaptive (FA) numerical integration method includes: 1) making an initial estimate of the step-size by finding the most urgent event from all control events and external events, 2) calculating the time derivatives and increments of the state vector based on the recursive property of state equations, 3) performing accuracy evaluation, 4) making order selection and step-size adjustment, and 5) performing numerical integration. For simplification, an element of the state vector will be described as an example.

Step (4.1) Initial estimate of the step-size by event sequencing. Take the smaller one of the time interval of the next control event $\Delta t_{k,ctr}$ and the time interval of the next external event $\Delta t_{k,ext}$ as the initial estimate of the step-size $\Delta t_k$. Besides, $\Delta t_k$ should not be larger than the user-specified maximum step-size $\Delta t_{max}$.

Step (4.2) Derivative and increment calculation. During the k-th interval of the numerical integration, the simulated system can be seen as a linear time-invariant (LTI) system, which means that the coefficient matrices of system equations $A_k, B_k, C_k, D_k$ are constant matrices independent from the time variable t and state vector x. Therefore, the time derivatives of the state vector can be obtained as Equation (6):

$$x^{(i)}(t)=A_k x^{(i-1)}(t)+B_k u^{(i-1)}(t) \quad i \geq 1 \tag{6}$$

where $x^{(i)}(t)$ and $u^{(i)}(t)$ are the i-th order time derivatives of the state vector x and the input vector u, respectively.

With the time derivatives of the state vector and based on Taylor series expansion, the numerical solution of the state equation at time point $t=t_{k+1}$ can be given by Equation (7):

$$X_{k+1} = x_k + \sum_{i=1}^{p} \frac{x_k^{(i)}}{i!} \Delta t_k^i \tag{7}$$

In the FA numerical integration, the i-th order increment $\Delta_i x_k$ is defined as:

$$\Delta_i x_k = \frac{x_k^{(i)}}{i!} \Delta t_k^i \tag{8}$$

Step (4.3) Accuracy evaluation.

It is determined whether the following inequality is satisfied.

$$\Delta_p x_k \leq abstol_k \tag{9}$$

where $abstol_k$ is the specified absolute error tolerance.

If Inequality (9) is satisfied (case 1), the method jumps to step (4.4); and if Inequality (9) is not satisfied, the evaluated order is raised by one order and the method jumps back to step (4.2). Generally, in order to prevent the algorithm's order from being too high, an upper limit of the order $q_{max}$ will be specified by the user before the simulation begins. If the accuracy requirement is not satisfied even if the highest allowable order $q_{max}$ is reached (case 2), the method will jump to step (4.4).

Step (4.4) Order selection and step-size adjustment. Order selection and step-size adjustment schemes are shown in Equation (10) and Equation (11), respectively. (Case 1 and 2)

$$q_k = \begin{cases} i, & \text{case 1} \\ q_{max} - 1, & \text{case 2} \end{cases} \quad (10)$$

$$\Delta t_k = \begin{cases} \Delta t_k, & \text{case 1} \\ \left( \dfrac{q_{max}! \cdot abstol_k}{x_k^{(q_{max})}} \right)^{\frac{1}{q_{max}}}, & \text{case 2} \end{cases} \quad (11)$$

Step (4.5) Numerical integration. Numerical integration is performed as shown in Equation (12):

$$x_{n,k} = \begin{cases} x_{p,k}^{(0)} + \sum_{i=1}^{q_k} \Delta_i x_{p,k}, & \text{case 1} \\ \sum_{i=0}^{q_{max}} \dfrac{1}{i!} x_{p,k}^{(i)} \Delta t^i, & \text{case 2} \end{cases} \quad (12)$$

For a n-dimensional state vector $x_k = [x_{k,1}, x_{k,2}, \ldots x_{k,n}]^T$, steps (4.3)-(4.4) should be performed to each element to determine the optimal order and step-size. Accuracy evaluation cannot be passed unless the accuracy requirements for all elements are satisfied.

Step (5): Passive Event Location

If a trigger variable crosses its corresponding threshold value, a passive event will be detected and will be located with an efficient secant method. Then the switching states of uncontrollable switching devices are determined and the step-size is shortened. Numerical integration is performed again since the step-size is shortened.

Step (5.1) Threshold condition detection. Whether a passive event happens can be determined by detecting if any trigger variable crosses its corresponding threshold condition. The threshold function $g_{th}(\Delta t)$ is defined as Equation (13):

$$g_{th}(\Delta t) = y_2(t) - c_{th} \quad (13)$$

When an element of the trigger vector crosses its threshold condition, the signs of the threshold function' values at the two ends of the integration interval will be opposite.

If any trigger variable crosses its corresponding threshold value, it can be known that a passive event happens and the method jumps to step (5.2). Otherwise, no passive event happens and the method jumps directly to step (5.5).

Step (5.2) Locating the passive event by the secant method. Suppose the step-size is small enough so that each trigger variable can only cross its corresponding threshold value once.

Since the time derivatives of the state vector $x_k^{(i)}$ ($1 \le i \le q_k$) and the time derivatives of the input vector $u_k^{(i)}$ ($1 \le i \le q_k$) at $t = t_k$ have been obtained in step (4), the time derivatives of the detected trigger variable can be given by $$y_{k,2d}^{(i)} = C_{k,d} x_k^{(i)} + D_{k,d} u_k^{(i)} \quad 1 \le i \le q_k \quad (14)$$

Based on Equation (14), the threshold function can be expressed in form of an explicit function of time, as shown in Equation (15):

$$g_{th}(\Delta t) = y_{k,2d} + \sum_{i=1}^{q_k} \dfrac{y_{k,2d}^{(i)}}{i!} \Delta t^i - c_{th} = 0 \quad (15)$$

Figure 2:
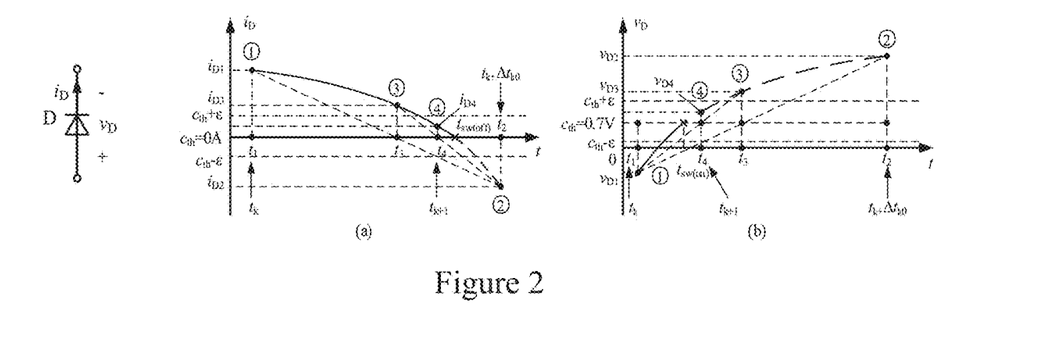
FIG. 2 shows the location mechanism of the passive events, including (a) the location mechanism of diode turn-off events, and (b) the location mechanism of diode turn-on events.

Then the secant method can be employed to find out the zero point of the threshold function $g_{th}(\Delta t)$ (i.e., the instant when the passive event occurs). Take a diode as an example, the location mechanism of its passive events is illustrated in FIG. 2, in which FIGS. 2(a) and 2(b) show the location processes of its turn-off event and its turn-on event, respectively. The iterative search process evolves as ①→②→③→④. Time point $t_4$ is accepted as the approximation of the exact switching time $t_{sw(off)}$ and $t_{sw(on)}$.

If more than one trigger variable crosses its corresponding threshold value, the time interval of the next passive event $\Delta t_{k,pas}$ will be the most urgent one.

Step (5.3) Determining switching states of uncontrollable switching devices. For example, a diode will be turned off if the value of the current which flows through it crosses zero, and it will be turned on if the value of the voltage across it crosses 0.7V, which is the forward voltage drop of it. After toggling the switching states of the uncontrollable devices that trigger the passive event, the switching states of uncontrollable devices at the (k+1)-th step $sw_{pas,k+1}$ can be determined.

Step (5.4) Numerical integration. If a passive event occurs, then the step-size must have been shortened compared with the step-size determined in Step (4). Therefore, the result of numerical integration obtained in Step (4) has to be discarded and numerical integration should be performed again.

Step (5.5) Calculating the next simulation time point.
If a passive event occurs, the next simulation time point can be given by:

$$t_{n,k} = t_{p,k} + \Delta t_{k,pas} \quad (16)$$

If no passive event occurs, the next simulation time point can be given by:

$$t_{n,k} = t_{p,k} + \Delta t_k \quad (17)$$

Step (6): Simulation Process Control

If the next simulation time point does not reach the user-specified simulation stop time, then let k=k+1 and the method jumps back to Step (2) to repeats Steps (2)~(5). If the next simulation time point exceeds the user-specified simulation stop time, then the simulation stop time is set as the last simulation time point and the simulation process is terminated after the system state calculation and waveform output are finished.

Specific Example

Figure 3:
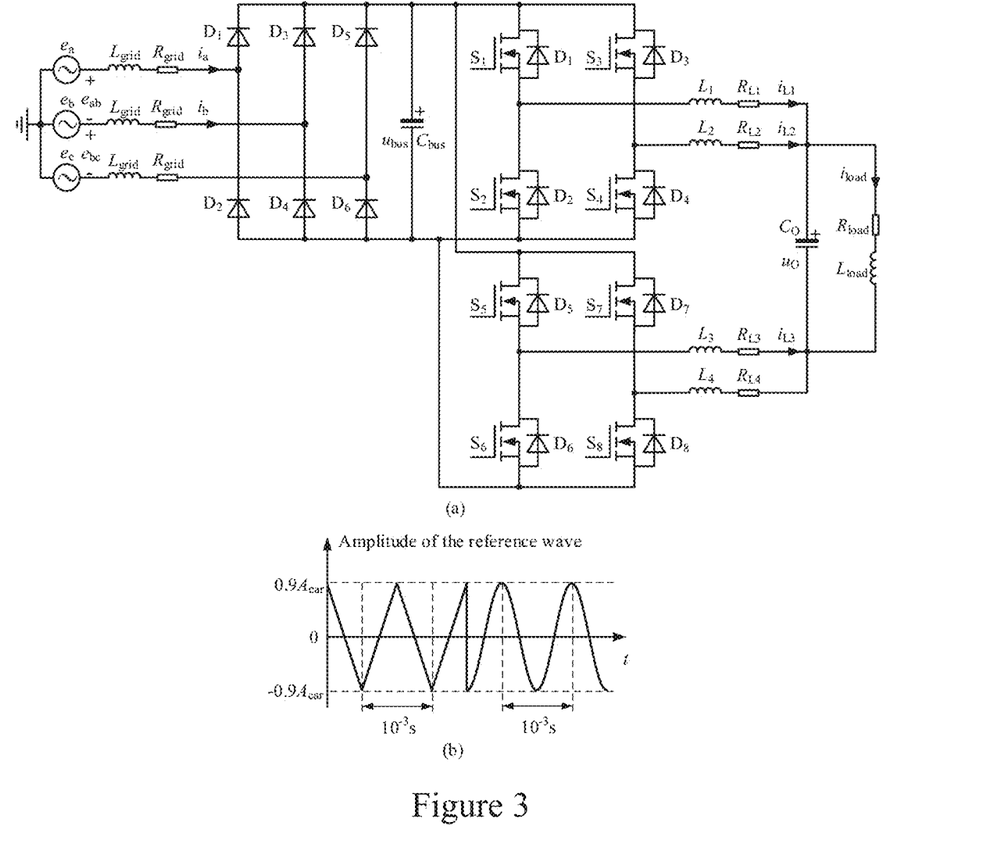
FIG. 3 shows the circuit topology of a multileg full-bridge Class-D amplifier (MFB CDA) being tested and the testing condition, wherein (a) shows the circuit topology of the amplifier and (b) shows the reference wave with a sudden change during the transient.

The embodiment of the present invention will now be applied to a multileg full-bridge Class-D amplifier (MFB CDA) shown in FIG. 3 (a) for better understanding the principle and advantages of the invention. The accuracy of DSED simulation results will be verified by comparisons with experimental waveforms, and the efficiency of DSED method will be demonstrated by comparisons with the existing commercial simulation tools in terms of the number of calculated points and the CPU time. The system parameters of the tested MFB CDA are: grid-side three-phase voltage (RMS) $e_{a,b,c(rms)}$=87V, grid-side resistance $R_{grid}$=0.2Ω, grid-side inductance $L_{grid}$=250 nH, DC-link capacitance $C_{bus}$=2695 μF, phase inductance $L_{1, 2, 3, 4}$=190 μH, phase resistance $R_{L1, 2, 3, 4}$=0.2Ω, output capacitance $C_O$=60 nF, load resistance $R_{Load}$=30Ω, load inductance $L_{Load}$=105 μH, switching frequency $f_s$=100 kHz, reference wave frequency $f_r$=1 kHz, modulation ratio M=0.9. The simulation stop time is 0.2 s. During the simulated transient process, the reference wave changes suddenly from the triangle wave to the sinusoidal wave, as show in FIG. 3 (b).

The proposed DSED simulation method includes the following six steps.

Step (1): Simulation Preparation and System State Initialization.

This step includes the following operations: 1) inputting the parameters of the main circuit and controllers, 2) formulating the state equation, the output equation and the threshold equation of the system according to the system topology and parameters and 3) pre-specifying the instant when the external event of sudden change of the reference wave occurs.

In this case, the state equation is $$\dot{x} = Ax + Bu \tag{18}$$

where the state vector $x = [u_{bus}, i_a, i_b, i_{L1}, i_{L2}, i_{L3}, u_{load}, i_{load}]^T_{8\times1}$, and the input vector $u = [e_{ab}, e_{bc}]^T_{2\times1}$.

Define switching variables $s_{a,b,c}$ to describe the switching states of the three legs of the three-phase diode rectifier. Define switching variables $s_{L1,L2,L3,L4}$ to describe the four legs of the CDA. The definition of the switching variables is: s=1 indicates that the upper device of the leg is on and the lower device is off, s=0 indicates that the upper device of the leg is off and the lower device is on, s=−1 indicates both devices of the leg are off. Based on the definition of the switching variables, the coefficient matrices can be given as $$A = \begin{bmatrix} A_{11} & A_{12} \\ A_{21} & A_{22} \end{bmatrix}_{8\times8}, B = \begin{bmatrix} B_{11} \\ 0_{5\times2} \end{bmatrix}_{8\times2} \tag{19}$$

where when $s_a$=−1, $s_b$=−1, $s_c$=−1, $A_{11}$=$0_{3\times3}$, $B_{11}$=$0_{3\times2}$; when s=−1, $s_b \neq$−1, $s_c \neq$−1, $$A_{11} = \begin{bmatrix} 0 & 0 & \frac{2s_b-1}{C_{bus}} \\ 0 & 0 & 0 \\ -\frac{2s_b-1}{2L_{grid}} & 0 & -\frac{R_{grid}}{L_{grid}} \end{bmatrix}_{3\times3},$$

$$B_{11} = \begin{bmatrix} 0 & 0 \\ 0 & 0 \\ 0 & \frac{1}{2L_{grid}} \end{bmatrix}_{3\times2};$$

when $s_a \neq -1, s_b = -1, s_c \neq -1$, $$A_{11} = \begin{bmatrix} 0 & \frac{2s_a-1}{C_{bus}} & 0 \\ -\frac{2s_a-1}{2L_{grid}} & -\frac{R_{grid}}{L_{grid}} & 0 \\ 0 & 0 & 0 \end{bmatrix}_{3\times3},$$

$$B_{11} = \begin{bmatrix} 0 & 0 \\ \frac{1}{2L_{grid}} & \frac{1}{2L_{grid}} \\ 0 & 0 \end{bmatrix}_{3\times2};$$

when $s_a \neq -1, s_b \neq -1, s_c \neq -1$, $$A_{11} = \begin{bmatrix} 0 & \frac{s_a-s_c}{C_{bus}} & \frac{s_a-s_c}{C_{bus}} \\ \frac{1}{L_{grid}}\left(\frac{s_a+s_b+s_c}{3}-s_a\right) & -\frac{R_{grid}}{L_{grid}} & 0 \\ \frac{1}{L_{grid}}\left(\frac{s_a+s_b+s_c}{3}-s_b\right) & 0 & -\frac{R_{grid}}{L_{grid}} \end{bmatrix}_{3\times3},$$

$$B_{11} = \begin{bmatrix} 0 & 0 \\ \frac{2}{3L_{grid}} & \frac{1}{3L_{grid}} \\ -\frac{1}{3L_{grid}} & \frac{1}{3L_{grid}} \end{bmatrix}_{3\times2}.$$

$$A_{12} = \begin{bmatrix} a_{12(1)} \\ 0_{2\times5} \end{bmatrix}_{3\times5},$$

$$a_{12(1)} = -\frac{1}{C_{bus}}[\, s_{L1}-s_{L4} \quad s_{L2}-s_{L4} \quad s_{L3}-s_{L4} \quad 0 \quad 0\,]^T_{1\times5}.$$

$$A_{21} = \begin{bmatrix} a_{21(1)} & 0_{3\times2} \\ 0_{2\times1} & 0_{2\times2} \end{bmatrix}_{5\times3},$$

$$a_{21(1)} = [a_{21(1,1)}, a_{21(2,1)}, a_{21(3,1)}]^T_{3\times1},$$

$$a_{21(1,1)} = \left[(s_{L4}-s_{L3}) + \frac{L_4}{L_2}(s_{L2}-s_{L1}) - \frac{L_3+L_4}{L_3}(s_{L1}-s_{L3})\right]/\beta,$$

$$\beta = -L_4 - L_1\left(\frac{L_4}{L_2} + \frac{L_3+L_4}{L_3}\right),$$

$$a_{21(2,1)} = [(s_{L2}-s_{L1}) + L_1 a_{21(1,1)}]/L_2,$$

$$a_{21(3,1)} = [(s_{L3}-s_{L1}) + L_1 a_{21(1,1)}]/L_3.$$

$$A_{22} = \begin{bmatrix} a_{22(1,1)} & a_{22(1,2)} & a_{22(1,3)} & a_{22(1,4)} & 0 \\ a_{22(2,1)} & a_{22(2,2)} & a_{22(2,3)} & a_{22(2,4)} & 0 \\ a_{22(3,1)} & a_{22(3,2)} & a_{22(3,3)} & a_{22(3,4)} & 0 \\ \frac{1}{C_{load}} & \frac{1}{C_{load}} & 0 & 0 & -\frac{1}{C_{load}} \\ 0 & 0 & 0 & \frac{1}{L_{load}} & -\frac{R_{load}}{L_{load}} \end{bmatrix}_{5\times5},$$

$$a_{22(1,1)} = \left[R_{L4} + \frac{L_4}{L_2}R_{L1} + \frac{L_3+L_4}{L_3}/R_{L1}\right]/\beta,$$

$$a_{22(1,2)} = \left(R_{L4} - \frac{L_4}{L_2}R_{L2}\right)/\beta,$$

$$a_{22(1,3)} = \left(R_{L4} - \frac{L_4}{L_3}R_{L3}\right)/\beta,$$

$$a_{22(1,4)} = \left(1 + \frac{L_4}{L_3}\right)/\beta,$$

$$a_{22(2,1)} = \frac{R_{L1} + L_1 a_{22(1,1)}}{L_2},$$

$$a_{22(2,2)} = \frac{-R_{L2} + L_1 a_{22(1,2)}}{L_2},$$

-continued $$a_{22(2,3)} = \frac{L_1 a_{22(1,3)}}{L_2},$$

$$a_{22(2,4)} = \frac{L_1 a_{22(1,4)}}{L_2},$$

$$a_{22(3,1)} = \frac{R_{L1} + L_1 a_{22(1,1)}}{L_3},$$

$$a_{22(3,2)} = \frac{L_1 a_{22(1,2)}}{L_3},$$

$$a_{22(3,3)} = \frac{-R_{L3} + L_1 a_{22(1,3)}}{L_3},$$

$$a_{22(3,4)} = \frac{1 + L_1 a_{22(1,4)}}{L_3}.$$

The output equation can be given by where $$y = Cx + Du \quad (20)$$

$$C = (c_{(i,j)}) \in \mathbb{R}^{2 \times 8},$$

$$c_{(i,j)} = \begin{cases} 1, & (i,j) = (1,4), (2,7) \\ 0, & (i,j) \neq (1,4), (2,7) \end{cases},$$

$$D = 0_{2 \times 2}.$$

The threshold equation can be given by $$\begin{cases} i_D(t) = 0A, & \text{the diode is on} \\ v_D(t) = 0.7 \text{ V}, & \text{the diode is off} \end{cases} \quad (21)$$

where $i_D$ is the current flowing through the diode and v, is the voltage across the diode.

Step (2): System State Updating and System Event Handling.

This step includes the operations of: 1) updating system states and 2) detecting and handling system events. If any control event or/and external event occurs, then the switching states of power switching devices or/and system parameters are updated. The detailed description of this step has been provided in Step (2) above.

Step (3): Coefficient Matrix Updating and Simulation Waveform Output.

If all switching states of power switching devices and system parameters remain unchanged, the coefficient matrices will be same as those at the last simulation time point. The output equation calculation and simulation waveform output are performed. If any switching state of power switching devices or system parameter changes, the coefficient matrices have to be updated, and output equation calculation and simulation waveform output are performed twice. The detailed description of this step has been provided in Step (3) above.

Step (4): Flexible Adaptive Numerical Integration.

This step includes the operations of: 1) making an initial estimate of the step-size by finding the most urgent event from all control events and external events, 2) calculating the time derivatives and increments of the state vector based on the recursive property of state equations, 3) performing accuracy evaluation, 4) making order selection and step-size adjustment and 5) performing numerical integration.

The detailed description of this step has been provided in Step (4) above.

Step (5): Passive Event Location.

If a trigger variable crosses it corresponding threshold value, a passive event will be detected and located with an efficient secant method. Then the switching states of uncontrollable switching devices are determined and the step-size is shortened. Numerical integration should be performed again since the step-size is shortened. The detailed description of this step has been provided in Step (5) above.

Step (6): Simulation Process Control.

If the next simulation time point doesn't reach the user-specified simulation stop time, then let k=k+1 and the method jumps back to Step (2) to repeat Steps (2)~(5). If the next simulation time point exceeds the user-specified simulation stop time, then the simulation stop time is set as the last simulation time point and the simulation process is terminated after system state calculation and waveform output are finished. The detailed description of this step has been provided in Step (6) above.

Analysis of Simulation Results

Figure 4:
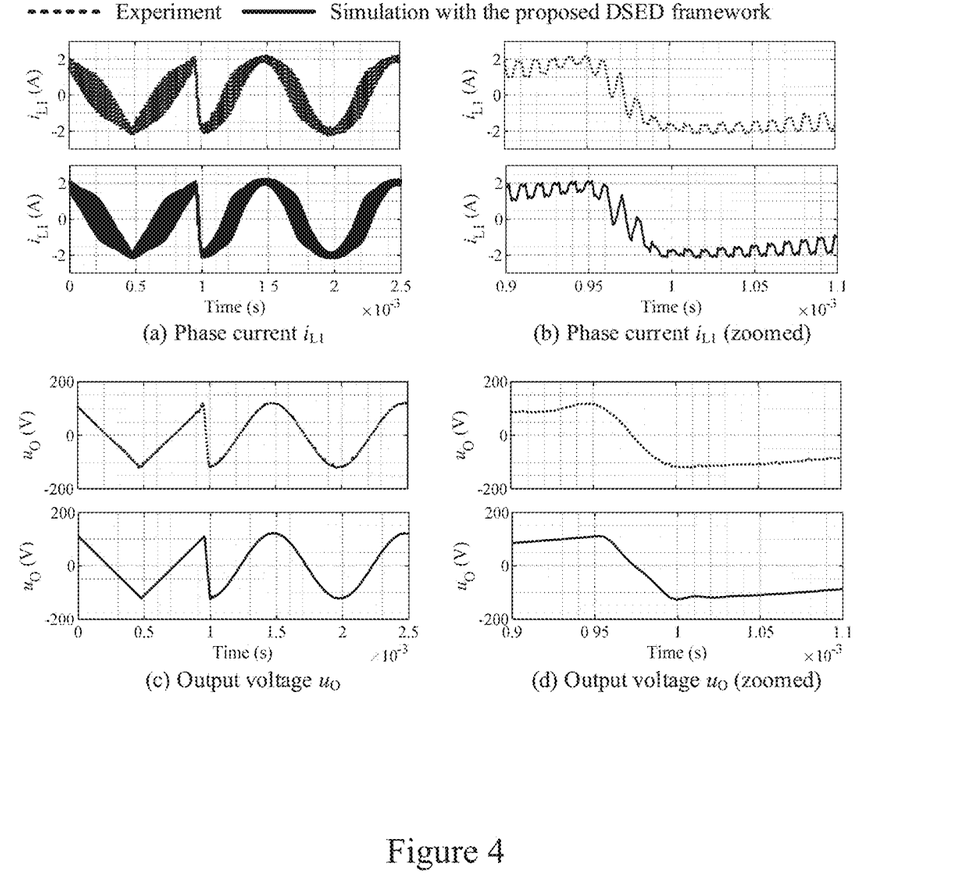
FIG. 4 shows comparisons between experimental waveforms and simulated waveforms of the present invention with respect to the simulation example as shown in FIG. 3.

FIG. 4 presents the comparisons between the DSED simulation waveforms and the experimental waveforms of the phase current $i_{L1}$ and the output voltage $u_O$ of the MFB CDA. As can be seen, excellent agreements between DSED simulation waveforms and experimental waveforms are achieved, which verifies the accuracy of the proposed DSED method.

To verify the efficiency of the proposed DSED framework with the FA algorithm, comparisons are made among the simulators and algorithms listed in TABLE I. To evaluate the efficiency improvement of the proposed FA algorithm independently, besides the FA algorithm, the ode45 (the Dormand-Prince) algorithm is embedded in the DSED simulation framework. Both of them are programmed in C++ and are identical except for the numerical integration algorithm. All simulations are performed on a computer with a 4.20 GHz Intel® Core™ i7-7700K CPU.

TABLE I

COMPARED SIMULATORS AND ALGORITHMS

| Simulator | Numerical integration algorithm | Step-size | order |
|---|---|---|---|
| Simulink | Ode1 (Euler) | Fixed | Fixed |
|  | Ode4 (Classical Runge-Kutta) | Fixed | Fixed |
|  | Ode23tb (TR-BDF 2) | Variable | Fixed |
|  | Ode45 (Dormand-Prince) | Variable | Fixed |
| PLECS | DOPRI (Dormand-Prince) | Variable | Fixed |
| DSED | Ode45 (Dormand-Prince) | Variable | Fixed |
|  | The proposed FA algorithm | Variable | Variable |

To evaluate the accuracy of the simulation waveforms, the relative error $Error_{rel}$ of an output variable y is defined as $$Error_{rel} = \frac{\|y_{sin} - y_{ref}\|_2}{\|y_{ref}\|_2} \quad (22)$$

where $y_{sim}$ is the simulation waveform vector and $y_{ref}$ is the reference waveform vector. $\|\cdot\|_2$ is the operator of Euclidean norm. If more than one output variable is simulated, then the comprehensive relative error of the simulation is defined as the geometric mean of all output variables' relative errors. The reference waveforms in this example are provided by Simulink with the ode45 algorithm and the maximum step-size is specified as 1ns.

Figure 5:
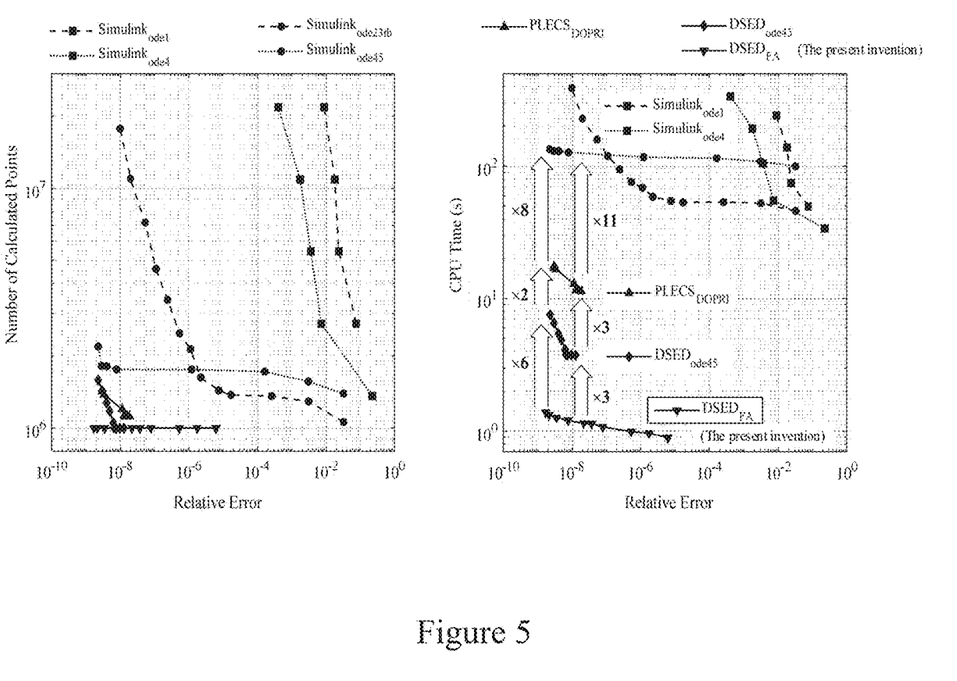
FIG. 5 shows the simulation efficiency test results of the simulation example as shown in FIG. 3.

The efficiency test results are presented in FIG. 5. It can be observed that the proposed DSED simulation framework with the FA numerical integration algorithm demonstrates the highest efficiency and the least storage space occupation. Approximately 10-fold and 100-fold improvements in simulation speed are achieved by the DSED framework with the FA algorithm in comparison with PLECS and Simulink, respectively. The FA algorithm contributes 3-6-fold efficiency improvement compared with the Dormand-Prince algorithm when both of them are embedded in the DSED framework.

In general, the embodiments of the present invention have some or all of the following advantages:

1. The proposed discrete state event-driven (DSED) simulation method is developed based on the understanding of the hybrid nature of power electronic systems and achieves both flexible integration of continuous states and efficient location of discrete events. The proposed DSED simulation method achieves significant improvement in simulation efficiency, with remarkably reduced computational costs at the same level of numerical accuracy.

2. The proposed flexible adaptive (FA) integration algorithm in the DSED simulation method is capable of adaptively adjust both step-size and order, so that the accuracy requirement can be satisfied with the minimum computational costs. Also, the adaptive adjustment scheme is totally embedded in the numerical integration process, no extra computation will be entailed.

3. Under the proposed event-driven (ED) mechanism, active events can be picked out and pre-scheduled before their occurrence, thus avoiding iterative calculations for active event location and significantly reducing the computational costs.

4. Under the proposed event-driven (ED) mechanism, passive events are located by the secant method. Since the explicit expressions of state variables as functions of time have been provided by the FA algorithm, the iterative search for passive events only involves the threshold function, which is an explicit function of time, rather than the entire numerical integration process, thus significantly reducing computational burdens.

Embodiments of the present invention can also be implemented as a computer-readable storage medium. The computer-readable storage medium can store program instructions, which can be executed by one or more processors to perform the simulation method of the embodiment of the present invention. The computer-readable storage medium may include, e.g., magnetic or optical medium such as fixed or movable disks, magnetic tape, CD-ROM, DVD-ROM, CD-R, CD-RW, DVD-R, DVD-RW or Blue Ray disk. The computer-readable storage medium may include volatile or non-volatile storage medium, such as RAM, ROM, flash memory, USB memory, etc. The computer-readable storage medium may also include microelectromechanical system (MEMS), and storage medium accessible via communication media such as network or wireless link.

Embodiments of the present invention have been described in conjunction with the drawings. Embodiments described above are only illustrative but not intended to limit the scope of the present invention. Those skilled in the art may make various modifications, equivalent replacement and improvements without departing the spirit and principle of the present invention. The protection scope of the present invention are defined by the appended claims only.

The invention claimed is:

1. A discrete state event-driven (DSED) simulation method for simulation of a power electronic system, wherein, using a processor: with respect to continuous states and discrete events in the power electronic system, the method includes:
numerical integration of the continuous states by a flexible adaptive algorithm with both variable step-size and variable order; and
location of the discrete events with an event-driven mechanism, in which active events are picked out and pre-scheduled before their occurrence while passive events are located by iterative search, wherein:
the active events are discrete events whose occurrence times can be determined in advance, including:
state events, which are triggered when an estimated error of a step reaches a user-specified error tolerance as the step-size extends,
control events, which are triggered by digital controllers in the power electronic system, and
external events, whose occurrence times can be pre-specified by a user before the simulation begins; and
the passive events are discrete events whose occurrence times cannot be determined in advance.

2. The discrete state event-driven (DSED) simulation method for simulation of a power electronic system according to claim 1, wherein:
in the k-th simulation interval, the power electronic system is modeled as a linear time-invariant (LTI) system characterized by state equations, output equations and threshold equations as shown in Equations (1)-(3), respectively:

$$\dot{x}(t)=A_k x(t)+B_k u(t)\ t_k<t\le t_{k+1} \quad (1)$$

$$y(t)=C_k x(t)+D_k u(t)\ t_k<t\le t_{k+1} \quad (2)$$

$$y_2(t)=c_{th} \quad (3)$$

where x is a state vector comprising a set of independent state variables, y is a output vector representing a set of outputs, and u is an input vector representing a set of independent inputs; $A_k, B_k, C_k, D_k$ are coefficient matrices determined by system topology and parameters; output vector y is comprised of two parts: a display vector $y_1$, which is a set of output variables of interest for simulation waveform display, and a trigger vector $y_2$, which is a set of output variables obtained for the detection of passive events, when any element of $y_2$ crosses its corresponding threshold condition value in the threshold vector $c_{th}$, a passive event will be detected; the coefficient matrices are functions of switching state vector $sw_k$ and system parameter vector $P_k$, as shown in Equation (4):

$$M_k=M(sw_k,P_k)\ M=A,B,C,D \quad (4).$$

3. The discrete state event-driven (DSED) simulation method for simulation of a power electronic system according to claim 2, wherein the method includes:
Step (1): simulation preparation and system state initialization;
Step (2): system state updating and control event/external event handling;
Step (3): coefficient matrices updating and simulation waveform output;
Step (4): flexible adaptive numerical integration of system states;
Step (5): passive event location; and
Step (6): simulation process control.

4. The discrete state event-driven (DSED) simulation method for simulation of a power electronic system according to claim 3, wherein in Step (1), the simulation preparation includes inputting system parameters, formulating systems equations and setting external events.

5. The discrete state event-driven (DSED) simulation method for simulation of a power electronic system according to claim 3, wherein in Step (2), if any control event or/and external event occurs, the switching states of controllable power switching devices or/and system parameters are updated, and the time interval of the next control event or/and external event is calculated.

6. The discrete state event-driven (DSED) simulation method for simulation of a power electronic system according to claim 3, wherein in Step (3), if all switching states of power switching devices and system parameters remain unchanged, the coefficient matrices are the same as those at the previous simulation time point, and the output equation is calculated and simulation waveform is output; if the switching state of any power switching device or any system parameter changes, the coefficient matrices are updated and output equation calculation and simulation waveform output are performed twice.

7. The discrete state event-driven (DSED) simulation method for simulation of a power electronic system according to claim 3, wherein Step (4) includes:
making an initial estimate of the step-size by finding the most urgent event from all control events and external events,
calculating the time derivatives and increments of the state vector based on the recursive property of state equations,
performing accuracy evaluation, and making order selection and step-size adjustment, and
performing numerical integration.

8. The discrete state event-driven (DSED) simulation method for simulation of a power electronic system according to claim 3, wherein in Step (5), if a trigger variable crosses its corresponding threshold value, a passive event will be detected and will be located with a secant method, the step-size is shortened, and numerical integration is performed again.

9. A non-transitory computer-readable storage medium having stored thereon program codes which when executed by one or more processors cause the one or more processors to perform a discrete state event-driven (DSED) simulation method for simulation of a power electronic system, wherein:
with respect to continuous states and discrete events in the power electronic system, the DSED method includes:
numerical integration of the continuous states by a flexible adaptive (FA) algorithm with both variable step-size and variable order; and
location of the discrete events with an event-driven (ED) mechanism, in which active events are picked out and pre-scheduled before their occurrence while passive events are located by iterative search, wherein:
the active events are discrete events whose occurrence times can be determined in advance, including:
state events, which are triggered when an estimated error of a step reaches a user-specified error tolerance as the step-size extends,
control events, which are triggered by digital controllers in the power electronic system, and
external events, whose occurrence times can be pre-specified by a user before the simulation begins; and
the passive events are discrete events whose occurrence times cannot be determined in advance.

10. The non-transitory computer-readable storage medium according to claim 8, wherein:
in the k-th simulation interval, the power electronic system is modeled as a linear time-invariant (LTI) system characterized by state equations, output equations and threshold equations as shown in Equations (1)-(3), respectively:

$$\dot{x}(t)=A_k x(t)+B_k u(t) \quad t_k < t \le t_{k+1} \tag{1}$$

$$y(t)=C_k x(t)+D_k u(t) \quad t_k < t \le t_{k+1} \tag{2}$$

$$y_2(t)=c_{th} \tag{3}$$

where x is a state vector comprising a set of independent state variables, y is a output vector representing a set of outputs, and u is an input vector representing a set of independent inputs; $A_k, B_k, C_k, D_k$ are coefficient matrices determined by system topology and parameters; output vector y is comprised of two parts: a display vector $y_1$, which is a set of output variables of interest for simulation waveform display, and a trigger vector $y_2$, which is a set of output variables obtained for the detection of passive events, when any element of $y_2$ crosses its corresponding threshold condition value in the threshold vector $c_{th}$, a passive event will be detected; the coefficient matrices are functions of switching state vector $sw_k$ and system parameter vector $P_k$, as shown in Equation (4):

$$M_k=M(sw_k,P_k) \quad M=A,B,C,D \tag{4}$$

11. The non-transitory computer-readable storage medium according to claim 10, wherein the method includes:
Step (1): simulation preparation and system state initialization;
Step (2): system state updating and control event/external event handling;
Step (3): coefficient matrices updating and simulation waveform output;
Step (4): flexible adaptive numerical integration of system states;
Step (5): passive event location; and
Step (6): simulation process control.

12. The non-transitory computer-readable storage medium according to claim 11, wherein in Step (1), the simulation preparation includes inputting system parameters, formulating systems equations and setting external events.

13. The non-transitory computer-readable storage medium according to claim 11, wherein in Step (2), if any control event or/and external event occurs, the switching states of controllable power switching devices or/and system parameters are updated, and the time interval of the next control event or/and external event is calculated.

14. The non-transitory computer-readable storage medium according to claim 11, wherein in Step (3), if all switching states of power switching devices and system parameters remain unchanged, the coefficient matrices are the same as those at the previous simulation time point, and the output equation is calculated and simulation waveform is output; if the switching state of any power switching device or any system parameter changes, the coefficient matrices are updated and output equation calculation and simulation waveform output are performed twice.

15. The non-transitory computer-readable storage medium according to claim 11, wherein Step (4) includes:
   making an initial estimate of the step-size by finding the most urgent event from all control events and external events,
   calculating the time derivatives and increments of the state vector based on the recursive property of state equations,
   performing accuracy evaluation, and making order selection and step-size adjustment, and
   performing numerical integration.

16. The non-transitory computer-readable storage medium according to claim 11, wherein in Step (5), if a trigger variable crosses its corresponding threshold value, a passive event will be detected and will be located with a secant method, the step-size is shortened, and numerical integration is performed again.

\* \* \* \* \*